(12) United States Patent
Aramaki

(10) Patent No.: US 9,591,296 B2
(45) Date of Patent: Mar. 7, 2017

(54) IMAGE PROCESSING DEVICE, IMAGE PROCESSING METHOD, AND IMAGE PROCESSING PROGRAM THAT LINKS THREE-DIMENSIONAL PROTRUSION INTENSITY SETTING VALUE AND USER INTERFACE SPATIAL RECOGNITION SENSITIVITY SETTING VALUE

(75) Inventor: Tatsuo Aramaki, Kawasaki (JP)

(73) Assignee: NEC Corporation, Tokyo (JP)

( * ) Notice: Subject to any disclaimer, the term of this patent is extended or adjusted under 35 U.S.C. 154(b) by 202 days.

(21) Appl. No.: 14/125,146

(22) PCT Filed: Jun. 22, 2012

(86) PCT No.: PCT/JP2012/066021
§ 371 (c)(1),
(2), (4) Date: Dec. 10, 2013

(87) PCT Pub. No.: WO2013/005586
PCT Pub. Date: Jan. 10, 2013

(65) Prior Publication Data
US 2014/0104400 A1    Apr. 17, 2014

(30) Foreign Application Priority Data

Jul. 4, 2011 (JP) ................. 2011-147919

(51) Int. Cl.
*H04N 13/04* (2006.01)
*G06F 3/041* (2006.01)
(Continued)

(52) U.S. Cl.
CPC ......... *H04N 13/0497* (2013.01); *G06F 3/041* (2013.01); *G06F 3/0416* (2013.01);
(Continued)

(58) Field of Classification Search
CPC .......... G06F 2203/04101; G06F 3/041; G06F 3/0416; G06F 3/04815; G06F 3/0488; H04N 13/0497
(Continued)

(56) References Cited

U.S. PATENT DOCUMENTS 8,797,317 B2 *  8/2014  Kim ................ G06F 3/04815
                                              345/419
9,043,732 B2 *  5/2015  Nurmi ................ G06F 1/1613
                                              348/51
(Continued)

FOREIGN PATENT DOCUMENTS

JP   09190278 A    7/1997
JP   2005135375 A  5/2005
(Continued)

OTHER PUBLICATIONS

Supplementary European Search Report corresponding to European Application No. 12807529.8, dated Mar. 2, 2015, 9 pages.
(Continued)

*Primary Examiner* — Francis G Geroleo
(74) *Attorney, Agent, or Firm* — Wilmer Cutler Pickering Hale and Dorr LLP

(57) ABSTRACT

An image processing device includes: a display unit which stereoscopically displays an image; an operation unit which is stereoscopically displayed so as to be spatially recognized and serves as an interface for operation by a user; and a control unit which links image display information by the display unit and spatial recognition information by the operation unit while matching the image display information and the spatial recognition information.

3 Claims, 4 Drawing Sheets

(51) Int. Cl.
*G06F 3/0488* (2013.01)
*G06F 3/0481* (2013.01)

(52) U.S. Cl.
CPC ........ *G06F 3/0488* (2013.01); *G06F 3/04815* (2013.01); *G06F 2203/04101* (2013.01)

(58) Field of Classification Search
USPC ...................... 348/43, 51; 345/173, 174, 419
See application file for complete search history.

(56) References Cited

U.S. PATENT DOCUMENTS

| | | | |
|---|---|---|---|
| 2008/0278454 A1* | 11/2008 | Lee | G06F 3/0488 345/173 |
| 2009/0289914 A1* | 11/2009 | Cho | G06F 3/044 345/173 |
| 2010/0095206 A1* | 4/2010 | Kim | G06F 3/017 715/702 |
| 2010/0117975 A1* | 5/2010 | Cho | G06F 1/1626 345/173 |
| 2010/0328438 A1 | 12/2010 | Ohyama | |
| 2011/0083106 A1 | 4/2011 | Hamagishi | |
| 2011/0115887 A1 | 5/2011 | Yoo et al. | |
| 2011/0187675 A1* | 8/2011 | Nakai | G06F 3/044 345/174 |
| 2011/0281619 A1* | 11/2011 | Cho | G06F 3/0488 455/566 |
| 2011/0296357 A1 | 12/2011 | Kim | |
| 2012/0019527 A1* | 1/2012 | Ugawa | G06F 3/044 345/419 |

FOREIGN PATENT DOCUMENTS

| | | |
|---|---|---|
| JP | 2010257160 A | 11/2010 |
| JP | 2011013778 A | 1/2011 |
| JP | 2011022961 A | 2/2011 |
| JP | 2012027794 A | 2/2012 |
| WO | WO-2012/53033 A1 | 4/2012 |

OTHER PUBLICATIONS

Wikipedia, "Mouse (Computing)", XP-002664135, URL:http://en.wikipedia.org/w/index.php?title=Mouse_%28computing%29&oldid=431188085; May 27, 2011, pp. 1-15.
International Search Report Corresponding to PCT/JP2012/066021, dated Sep. 25, 2012, 4 pages.
Japanese Office Action corresponding to Japanese Application No. 2013-522818, dated Oct. 6, 2015, 5 pages.

* cited by examiner

IMAGE PROCESSING DEVICE, IMAGE PROCESSING METHOD, AND IMAGE PROCESSING PROGRAM THAT LINKS THREE-DIMENSIONAL PROTRUSION INTENSITY SETTING VALUE AND USER INTERFACE SPATIAL RECOGNITION SENSITIVITY SETTING VALUE

This application is a national stage application of International Application No. PCT/JP2012/066021 entitled "Image Processing Device, Image Processing Method, and Image Processing Program," filed on Jun. 22, 2012, which claims priority to Japanese Patent Application No. 2011-147919, filed on Jul. 4, 2011, the disclosures of each of which are hereby incorporated by reference in their entirety.

TECHNICAL FIELD

The present invention relates to an image processing device that performs image processing for stereoscopically displaying an image, an image processing method, and an image processing program.

BACKGROUND ART

In recent years, LCD televisions that are provided with a 3D (three-dimensional) image processing function that stereoscopically displays an image and smartphones with a portable telephone function and portable information terminal function have come to be known. Methods of stereoscopically displaying an image include a method that shows a stereoscopic image by using polarized glasses, and a method that shows a stereoscopic image by unaided vision without using polarized glasses. The latter method that shows a stereoscopic image by unaided vision uses the parallax barrier method that stereoscopically shows an image by utilizing the parallax between the left eye and the right eye. That is to say, this parallax barrier method enables stereoscopic vision of an image by creating minute gaps by a liquid crystal, and separately showing different images to the left and right eyes.

As a 3D stereoscopic image display device of this kind of parallax barrier method, there is known a device that includes a user interface in which operation detection is possible at the image formation position of a stereoscopic image (for example, refer to Patent Document 1). According to this technology, for example, as the user interface, four operation buttons (start buttons) are stereoscopically displayed at the same 3D display height (Hf). Among the four start buttons "START A", "START B", "START C", "START D" that are stereoscopically displayed, when the "START C" button is operated, at that point in time, a sensor response (object judgment) immediately occurs. Also, immediately, only the "START C" button that has been operated is changed to a two-dimensional (2D) display state in which the 3D display height Hf=0. For that reason, even with stereoscopic images, the operator immediately understands the operation result at the time of operation in the same manner as the case of ordinary two-dimensional images. For that reason, operational discomfort is resolved.

The quality of this kind of operation responsiveness is attained by matching sensor response positions to the image formation positions of stereoscopic images separated from the outer surface of the liquid crystal panel (that is to say, the 3D display height Hf). At this time, the image state of the three start buttons "START A", "START B", "START C" other than the start button "START C" remain as they are, and the image state of the operated start button "START C" is switched. That is to say, since the image state of the three start buttons "START A", "START B", "START C" remains at the 3D display height Hf, the parallax barrier is maintained as is. On the other hand, only the image state of the start button "START C" switches to 2D. In order to realize this kind of image display phenomenon, it is necessary for a stereoscopic image display device to be constituted so that a desired requirement relating to the aforementioned sensitivity property (that is to say, the phenomenon of a start button immediately switching to the 2D display state by operation detection of the start buttons at the 3D image formation positions) is satisfied.

As other related art, there is disclosed the art of an image display system that can change the protrusion amount of a partial region of a stereoscopic image (for example, refer to Patent Document 2). That is to say, ordinarily, it is not possible to modify the protrusion amount of each object of a stereoscopic image from only the left-and-right-eye formatted data that uses the parallax barrier method. However, the art that is disclosed in Patent Document 2, in the case of the left-and-right-eye formatted data being image data such as that obtained using for example a stereo camera, includes data of a format in which modification of the protrusion amount is possible (hereinbelow sometimes referred to as "modifiable data") in 3D data and performs a synthesis process of the left-and-right-eye formatted data in which the protrusion amount is fixed, and this modifiable data. This process enables modification of the protrusion amount for a partial region of the stereoscopic image at the side of a terminal device. Besides data in which single-eye-formatted data has been converted to a stereoscopically displayable format, left-and-right-eye formatted data being data of a format in which the protrusion amount can be modified by modifying the horizontal direction relative distance of data corresponding to both eyes is included in the aforementioned modifiable data. In other words, in this related art, the protrusion amount of a partial region of a stereoscopic image is modified based on the modifiable data.

As other related art, technology is disclosed that can realize an operation feeling approximating an operation of a more realistic three-dimensional space by detecting the spatial position with a touch panel (for example, refer to Patent Document 3 and Patent Document 4).

PRIOR ART DOCUMENTS

Patent Documents

[Patent Document 1] Japanese Unexamined Patent Application, First Publication No. 2011-13778
[Patent Document 2] Japanese Unexamined Patent Application, First Publication No. 2005-135375
[Patent Document 3] Japanese Unexamined Patent Application, First Publication No. 2011-22961
[Patent Document 4] Japanese Unexamined Patent Application, First Publication No. 2010-257160

SUMMARY OF THE INVENTION

Problem to be Solved by the Invention

The art of Patent Document 1 can get rid of operational discomfort of the stereoscopic image by realizing a user interface in which operation detection is possible at image formation positions of the stereoscopic image. However, this art cannot achieve the enhancement of detailed operability complying with the protrusion amount of stereoscopic images.

The art of Patent Document 2 can change the protrusion amount of a partial region of a stereoscopic image. However, this art cannot vary the sensitivity setting of the spatial recognition of an operation button (user interface) that is stereoscopically displayed, in accordance with the protrusion amount of a stereoscopic image. For this reason, it is not possible to realize an operation with a realistic sensation in accordance with the protrusion amount of stereoscopic images.

The art of Patent Documents 3 and 4 can realize an operation feeling approximating an operation of a more realistic three-dimensional space by detecting a spatial position by a touch panel. However, this art cannot achieve an enhancement of the operability of a touch panel in accordance with the protrusion amount of stereoscopic images.

Moreover, even if the techniques of the various patent documents are combined, in the case of the image region that protrudes three-dimensionally and the region that can be detected by touch with a touch panel not agreeing, there is the risk of not being possible to perform touch detection of a desired touch panel, and an erroneous operation of the touch panel occurring.

The present invention has been achieved in view of the above circumstances. An exemplary object of the present invention is to provide an image processing device which achieves an enhancement of the operability of a touch panel, by being able to vary the sensitivity of the touch panel in accordance with the protrusion amount of a stereoscopic image, an image processing method, and an image processing program.

Means for Solving the Problem

In order to attain the aforementioned object, an image processing device according to one aspect of the present invention includes: a display unit which stereoscopically displays an image; an operation unit which is stereoscopically displayed so as to be spatially recognized and serves as an interface for operation by a user; and a control unit which links image display information by the display unit and spatial recognition information by the operation unit while matching the image display information and the spatial recognition information.

An image processing method according one aspect of the present invention includes a display step of stereoscopically displaying an image; an operation step of stereoscopically displayed so as to be spatially recognized and serving as an interface for operation by a user; and a control step of linking image display information displayed by the display step and spatial recognition information which is realized by the operation step while matching the image display information and the spatial recognition information.

An image processing program according to one aspect of the present invention causes a computer to execute: a display step which stereoscopically displays an image; an operation step which is stereoscopically displayed so as to be spatially recognized and serves as an interface for operation by a user; and a control step which links image display information displayed by the display step and spatial recognition information realized by the operation step while matching the image display information and the spatial recognition information.

Effect of the Invention

According to the present invention, it is possible to enhance the operability of a spatial touch panel during 3D/2D, and it is possible to prevent an erroneous operation of a spatial touch panel due to a sensory visual error.

EMBODIMENTS FOR CARRYING OUT THE INVENTION

Outline

Figure 1:
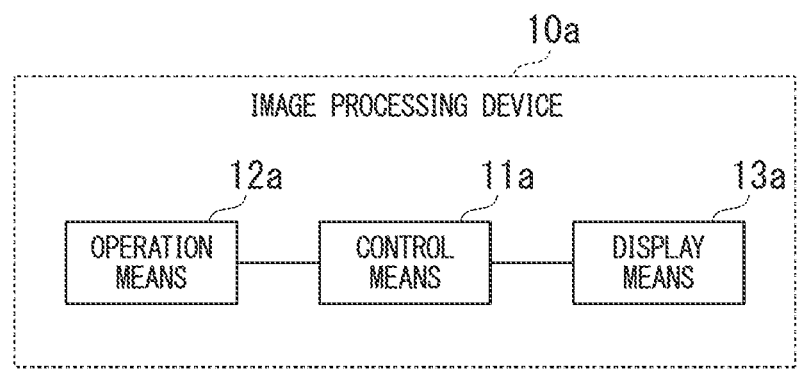
FIG. 1 is a block drawing that shows a basic configuration of an image processing device that is applied to an exemplary embodiment of the present invention.

An image processing device according to an exemplary embodiment of the present invention links the intensity setting of the 3D protrusion amount in a stereoscopic image (3D protrusion intensity setting value) and the sensitivity level setting of a stereoscopic display touch panel (hereinbelow called a spatial touch panel) in which spatial recognition is possible (spatial recognition sensitivity setting value). Thereby, the operability of the spatial touch panel is improved during 3D/2D.

Stated in greater detail, the image processing device according to the exemplary embodiment of the present invention includes a liquid crystal display unit in which the display of stereoscopic images is possible, and a touch panel in which spatial recognition is possible (spatial touch panel). In accordance with the display state of a stereoscopic image (3D protrusion amount intensity setting), the intensity setting of the spatial touch panel detection sensitivity (sensitivity level setting) is changed. Alternatively, in accordance with the detection sensitivity intensity setting of the spatial touch panel (sensitivity level setting), the display state of a stereoscopic image (3D protrusion amount intensity setting) is changed. Thereby, it is possible to enhance the operability of a spatial touch panel during 3D/2D. Hereinbelow, a preferred exemplary embodiment of an image processing device according to the exemplary embodiment of the present invention shall be described in detail while referring to the drawings.

Exemplary Embodiment

FIG. 1 is a block diagram that shows a basic configuration of an image processing device that is applied to the exemplary embodiment of the present invention. As shown in FIG. 1, an image processing device 10a is constituted by including a control means 11a, an operation means 12a, and a display means 13a. The display means 13a includes a function of stereoscopically displaying an image. The operation means 12a is stereoscopically displayed in such a manner that spatial recognition is possible, and includes a function as an interface for operation by a user. The control means 11a includes a function of performing the control of linking the image display information by the display means 13a and the spatial recognition information by the operations means 12a while matching them.

With this kind of constitution, the higher the 3D protrusion intensity setting value of an image that is displayed in the display means 13a, the control means 11a sets the spatial recognition sensitivity setting value by the control means 12a to a higher sensitivity. Alternatively, the higher the sensitivity the spatial recognition sensitivity setting value by the operation means 12a is set to, the control means 11a more highly sets the 3D protrusion intensity setting value of an image that is displayed in the display means 13a.

Figure 2:
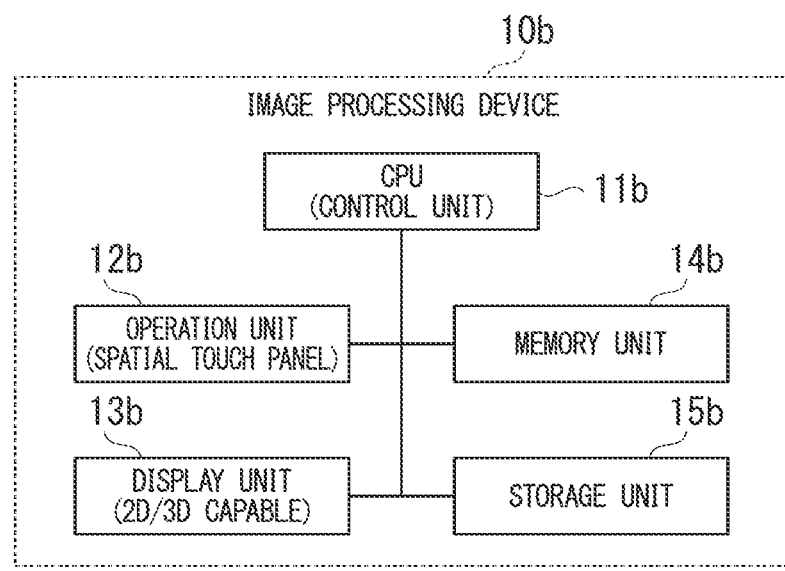
FIG. 2 is a block diagram that shows a specific constitution of an image processing device that is applied to an exemplary embodiment of the present invention.

FIG. 2 is a block diagram that shows a specific constitution of an image processing device that is applied to the exemplary embodiment of the present invention. In relation to the correspondence relation between the constituent elements of FIG. 1 and the constituent elements of FIG. 2, the control means 11a corresponds to a CPU (Central Processing Unit) 11b, the operation means 12a corresponds to an operation unit 12b, and the display means 13a corresponds to a display unit 13b. That is to say, the image processing device 10b shown in FIG. 2, in addition to the CPU (control unit) 11b, the operation unit (spatial touch panel) 12b, and the display unit 13b, is constituted by further including a memory unit 14b and a storage unit 15b. The CPU 11b performs control of the entire image processing device 10b. The operation unit 12b is a user interface for the user to perform various input operations. The display unit 13b outputs various information to the user by 2D/3D. The memory unit 14b temporarily saves information input by the user and operation information. The storage unit 15b stores information input by the user and operation information.

Figure 3:
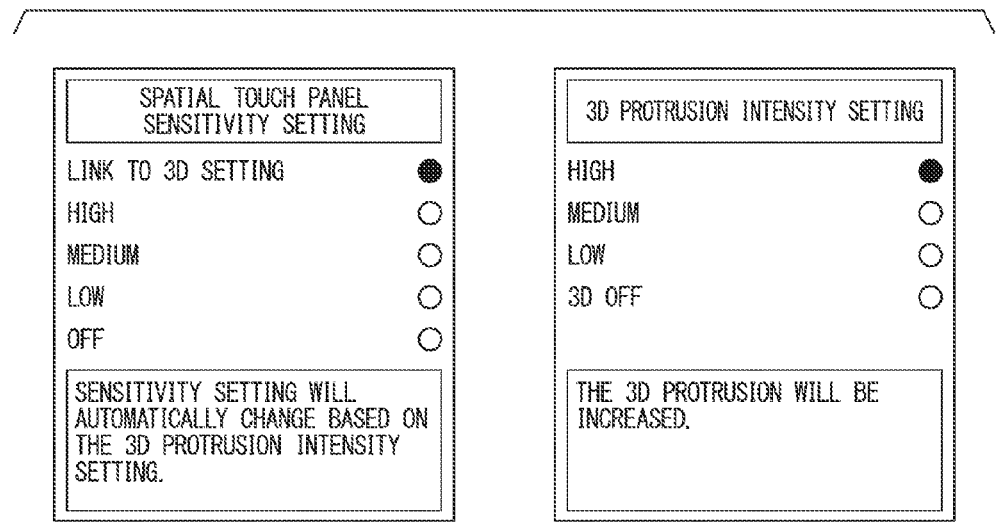
FIG. 3 is a screen shot of selecting the intensity setting of a detection sensitivity of a spatial touch panel in an operation unit, linked to the intensity setting of the 3D protrusion amount of a display unit, in the image processing device shown in FIG. 2.

Next, the operation of the image processing device 10b shown in FIG. 2 shall be described. FIG. 3 is an example of a screen shot of the intensity setting of the detection sensitivity of the spatial touch panel in the operation unit 12b being set to be linked to the 3D protrusion amount intensity setting of the display unit 13b, in the image processing device 10b shown in FIG. 2. That is to say, FIG. 2 shows an example of a screen shot for the case of a selection choice being provided so that the user selects the intensity setting of the detection sensitivity (sensitivity level setting) of the spatial touch panel in the operation unit 12b to be linked to the display state of the stereoscopic image of the display unit 13b (intensity setting of the 3D protrusion amount).

Figure 4:
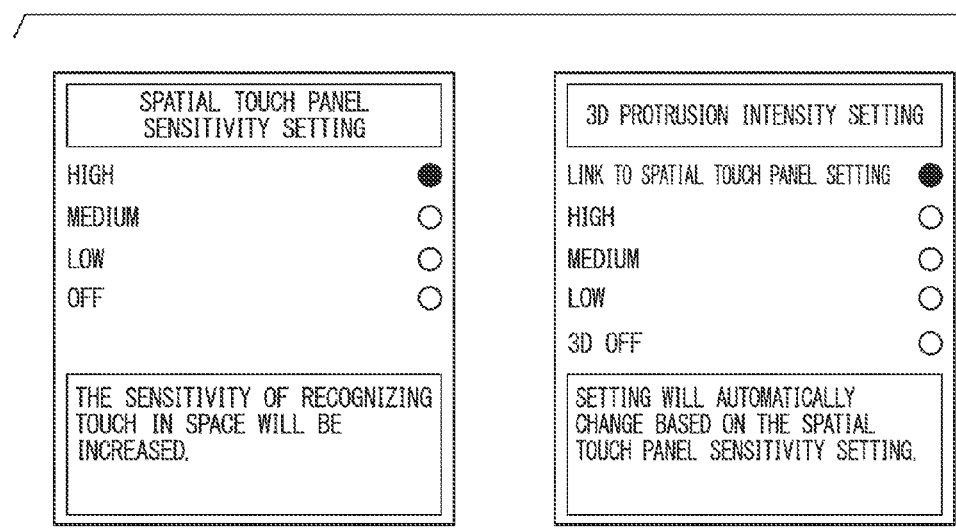
FIG. 4 is a screen shot of selecting the intensity setting of the 3D protrusion amount of the display unit, linked to the intensity setting of the spatial touch panel detection sensitivity in the operation unit, in the image processing device shown in FIG. 2.

FIG. 4 is an example of a screen shot of selecting the intensity setting of the 3D protrusion amount of the display unit 13b to be linked to the intensity setting of the detection sensitivity of the spatial touch panel in the operation unit 12b. That is to say, FIG. 3 shows an example of a screen shot for the case of a selection choice being provided so that the user selects the intensity setting of the 3D protrusion amount of the display unit 13b, which is capable of 2D/3D display, to be linked to the intensity setting of the detection sensitivity (sensitivity level setting) of the spatial touch panel in the operation unit 12b.

Figure 5:
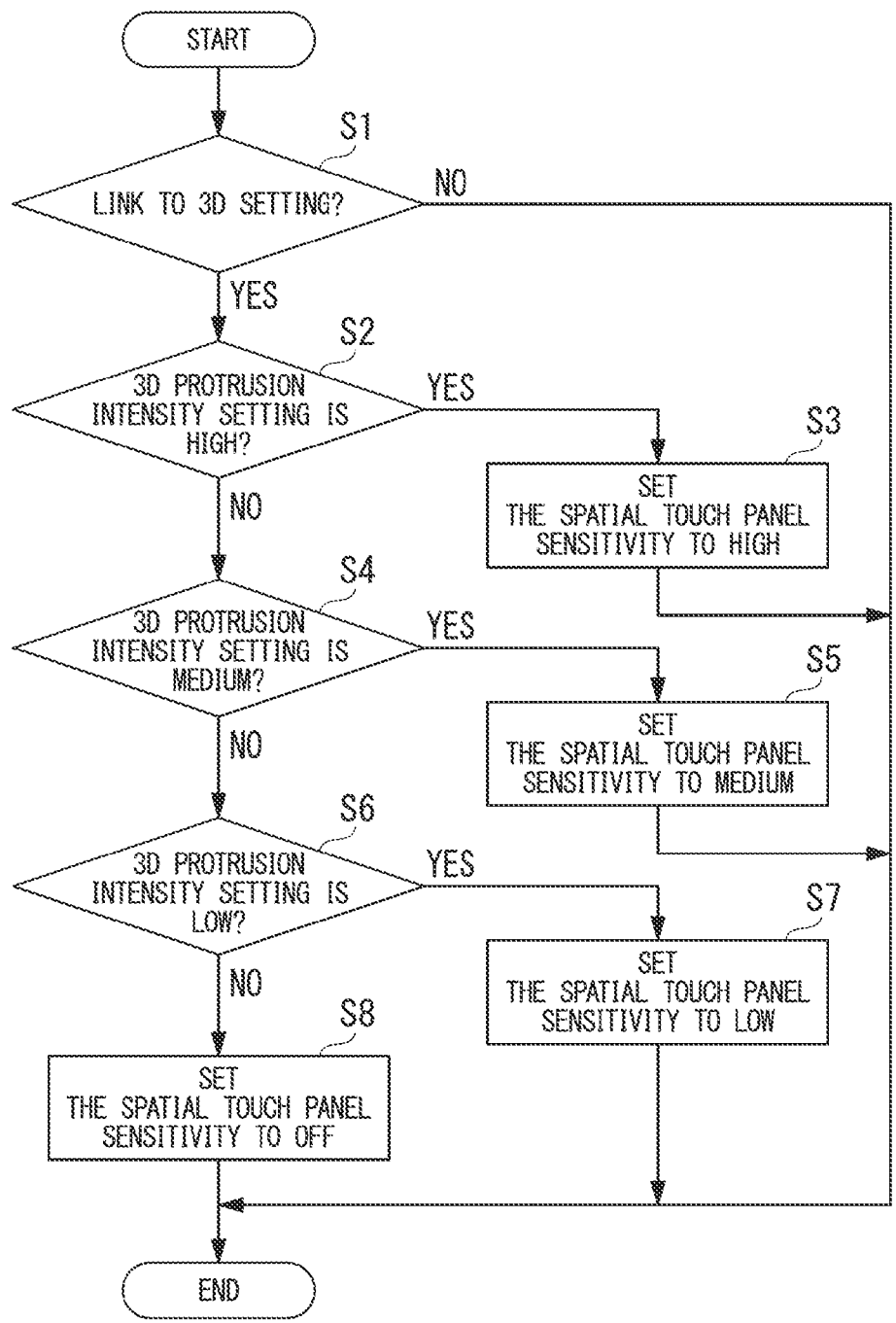
FIG. 5 is a flowchart that shows the flow of control in the case of providing a selection choice of the intensity setting of the detection sensitivity of the spatial touch panel in the operation unit being linked to the intensity setting of the 3D protrusion amount of the display unit shown in FIG. 3.
Figure 6:
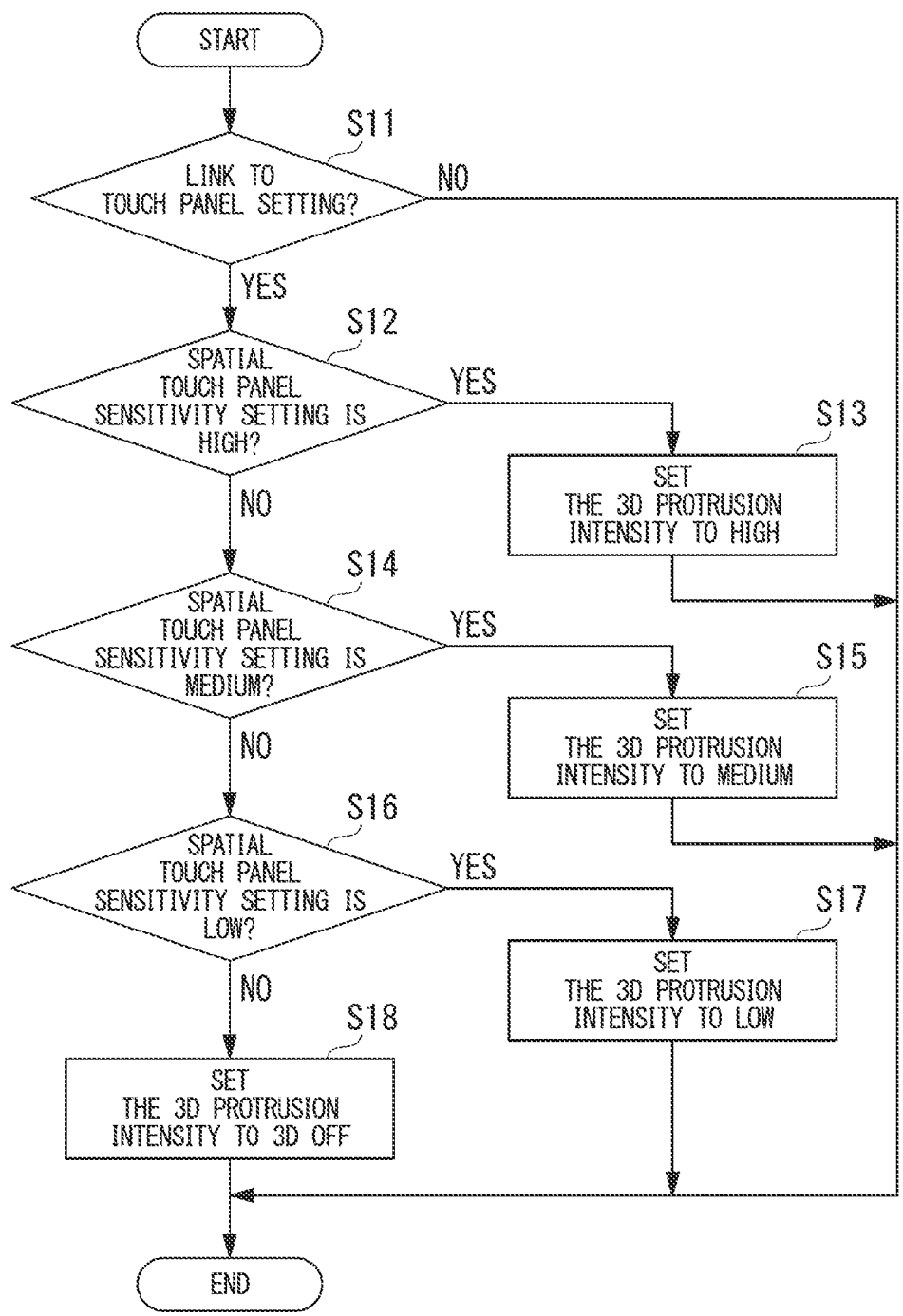
FIG. 6 is a flowchart that shows the flow of control in the case of providing a selection choice of the intensity setting of the 3D protrusion amount of the display unit being linked to the intensity setting of the detection sensitivity of the spatial touch panel in the operation unit shown in FIG. 4.

FIG. 5 is a flowchart that shows the flow of control in the case of providing a selection choice of the intensity setting of the detection sensitivity of the spatial touch panel in the operation unit 12b being linked to the intensity setting of the 3D protrusion amount of the display unit 13b shown in FIG. 3. FIG. 6 is a flowchart that shows the flow of control in the case of providing a selection choice of the intensity setting of the 3D protrusion amount of the display unit 13b being linked to the intensity setting of the detection sensitivity of the spatial touch panel in the operation unit 12b shown in FIG. 4.

Hereinbelow, the operation of the image processing device 10b shown in FIG. 2 shall be described, referring to FIG. 3, FIG. 4, FIG. 5 and FIG. 6. Initially, the selection procedure of the intensity setting of the detection sensitivity of the spatial touch panel linked to the intensity setting of the 3D protrusion amount shall be described, referring to FIG. 3 and FIG. 5.

As the initial setting screen of operation in the flowchart shown in FIG. 5, as shown in the right screen of FIG. 3, the selection choices including "High", "Medium", "Low" and "3D Off" are shown as the "3D Protrusion Intensity Setting". In the example shown in the right screen of FIG. 3, among these selection choices, "High" is selected. That is to say, a black mark is shown on the right side of "High". In this way, when the "3D Protrusion Intensity Setting" has been set to "High", "Increasing the 3D protrusion" is shown at the bottom of that screen. As shown in the left screen of FIG. 3, in relation to the "Spatial Touch Panel Sensitivity Setting", a black mark is shown on the right side of "Link to 3D Setting". In this way, when "Spatial Touch Panel Sensitivity Setting" is set to "Link to 3D Setting", "Sensitivity setting will automatically change based on the 3D Protrusion Intensity Setting" is shown at the bottom of that screen.

Next, based on the flowchart of FIG. 5, the operation of setting the spatial touch panel sensitivity which is linked to the 3D protrusion amount setting in the case of the screen of FIG. 3 shall be described. First, in the left screen of FIG. 3, the CPU 11b checks whether or not the "Spatial Touch Panel Sensitivity Setting" is set to "Link to 3D Setting" (Step S1). If the "Spatial Touch Panel Sensitivity Setting" is not set to "Link to 3D Setting" ("No" in Step S1), this process ends. On the other hand, if the "Spatial Touch Panel Sensitivity Setting" has been set to "Link to 3D Setting" ("Yes" in Step S1), the CPU 11b checks whether or not the "3D Protrusion Intensity Setting" of the right screen in FIG. 3 has been set to "High" (Step S2).

In Step S2, if the "3D Protrusion Intensity Setting" of the right screen has been set to "High" ("Yes" in Step S2), the CPU 11b sets the spatial touch panel sensitivity to "High" (Step S3).

On the other hand, if the "3D Protrusion Intensity Setting" of the right screen has not been set to "High" ("No" in Step S2), the CPU 11b checks whether or not the "3D Protrusion Intensity Setting" of the right screen has been set to "Medium" (Step S4). If the "3D Protrusion Intensity Setting" of the right screen has been set to "Medium" ("Yes" in Step S4), the CPU 11b sets the spatial touch panel sensitivity to "Medium" (Step S5).

On the other hand, in Step S4, if the "3D Protrusion Intensity Setting" of the right screen has not been set to "Medium" ("No" in Step S4), the CPU 11b checks whether or not the "3D Protrusion Intensity Setting" of the right screen has been set to "Low" (Step S6). If the "3D Protrusion Intensity Setting" of the right screen has been set to "Low" ("Yes" in Step S6), the CPU 11b sets the spatial touch panel sensitivity to "Low" (Step S7).

On the other hand, in Step S6, if the "3D Protrusion Intensity Setting" of the right screen has not been set to "Low" ("No" in Step S6), the CPU 11b sets the spatial touch panel sensitivity to "Off" (Step S8). In this manner, in the case of the "Spatial Touch Panel Sensitivity Setting" of the right screen of FIG. 3 being set to "Link to 3D Setting", a process is performed that individually performs a judgment in accordance with the intensity setting in the "3D Protrusion Intensity Setting" of the right screen, and sets the sensitivity of the spatial touch panel to the corresponding intensity in the manner of the process of Steps S2 to S8.

Next, referring to FIG. 4 and FIG. 6, the selection procedure of the intensity setting for the 3D protrusion amount linked to the intensity setting of the detection sensitivity of the spatial touch panel shall be described.

As the initial setting screen of the operation in the flowchart shown in FIG. 6, a black mark is shown on the right side of "Link to Spatial Touch Panel Setting" in the example shown in the right screen of FIG. 4. In this way, when "3D Protrusion Intensity Setting" has been set to "Link to Spatial Touch Panel Setting", "Setting will automatically change based on the spatial touch panel sensitivity setting" will be displayed at the bottom of that screen. As shown in the left screen of FIG. 4, in relation to the "Spatial Touch Panel Sensitivity Setting", "High" is selected among the selection choices including "High", "Medium", "Low" and "Off". That is to say, a black mark is shown on the right side of "High". In this way, when the "Spatial Touch Panel Sensitivity Setting" has been set to "High", "Increasing the sensitivity of recognizing touch in space" is displayed at the bottom of that screen.

Next, the operation of setting the 3D protrusion amount linked to the setting of the spatial touch panel sensitivity shall be described in the case of the screens of FIG. 4, based on the flowchart of FIG. 6. First, referring to the right screen of FIG. 4, the CPU 11b checks whether or not the "3D Protrusion Intensity Setting" has been set to "Link to Spatial Touch Panel Setting" (Step S11). If the "3D Protrusion Intensity Setting" has not been set to "Link to Spatial Touch Panel Setting" ("No" in Step S11), this process ends. On the other hand, if the "3D Protrusion Intensity Setting" has been set to "Link to Spatial Touch Panel Setting" ("Yes" in Step S11), the CPU 11b checks whether or not the "Spatial Touch Panel Sensitivity Setting" of the left screen of FIG. 4 has been set to "High" (Step S12).

In Step S12, if the "Spatial Touch Panel Sensitivity Setting" of the left screen of FIG. 4 has been set to "High" ("Yes" in Step S12), the CPU 11b sets the 3D protrusion intensity to "High" (Step S13).

On the other hand, in Step S12, if the "Spatial Touch Panel Sensitivity Setting" of the left screen of FIG. 4 has not been set to "High" ("No" in Step S12), the CPU 11b checks whether or not the "Spatial Touch Panel Sensitivity Setting" of the left screen has been set to "Medium" (Step S14). If the "Spatial Touch Panel Sensitivity Setting" of the left screen of FIG. 4 has been set to "Medium" ("Yes" in Step S14), the CPU 11b sets the 3D protrusion intensity to "Medium" (Step S15).

On the other hand, in Step S14, if the "Spatial Touch Panel Sensitivity Setting" of the left screen of FIG. 4 has not been set to "Medium" ("No" in Step S14), the CPU 11b checks whether or not the "Spatial Touch Panel Sensitivity Setting" of the left screen has been set to "Low" (Step S16). If the "Spatial Touch Panel Sensitivity Setting" of the left screen of FIG. 4 has been set to "Low" ("Yes" in Step S16), the CPU 11b sets the 3D protrusion intensity to "Low" (Step S17).

On the other hand, in Step S16, if the "Spatial Touch Panel Sensitivity Setting" of the left screen of FIG. 4 has not been set to "Low" ("No" in Step S16), the CPU 11b sets the 3D protrusion intensity to "3D Off" (Step S18). In this manner, in the case of the "3D Protrusion Intensity Setting" of the right screen of FIG. 4 being set to "Link to Spatial Touch Panel Setting", a process is performed that individually performs a judgment in accordance with the intensity setting of the "Spatial Touch Panel Sensitivity Setting" of the left screen, and sets the 3D protrusion intensity to the corresponding intensity in the manner of the process of Step S12 to S18.

In the above manner, in the image processing device according to the exemplary embodiment of the present invention, the CPU (control unit) 11b controls the intensity setting of the 3D protrusion amount of a stereoscopic image that is displayed on the display unit 13b, and the setting of the recognition sensitivity of the spatial touch panel by the operation unit 12 in a linked manner while matching them. With this control, it is possible to enhance the operability of a spatial touch panel during 3D/2D. Also, thereby it is possible to prevent erroneous operation of a spatial touch panel due to a sensory visual error.

The exemplary embodiments of the image processing devices according to the present invention have been described in detail above referring to the drawings, but specific constitutions of the present invention are not limited to the content of the exemplary embodiments given above, and design modifications which do not depart from the scope of the present invention are included in the present invention.

The operation of the aforementioned image processing device 10b is stored on a computer-readable storage medium in the format of a program, and if a computer system reads and executes the program, the aforementioned processes are realized. The computer-readable storage medium means a magnetic disk, magneto-optical disk, CD-ROM, DVD-ROM, semiconductor memory, and the like. This computer program may be delivered to a computer by a communication line, and the computer that has received this delivery may execute that program.

The above-described program may also be one for implementing a portion of the above-described functions.

The above-described program may also be a so-called differential file (differential program), which can implement the functions described above in combination with a program already stored in the computer system.

This application is based upon and claims the benefit of priority from Japanese patent application No. 2011-147919, filed Jul. 4, 2011, the disclosure of which is incorporated herein in its entirety by reference.

The image processing device of the present invention is not limited to televisions, mobile phones, smartphones and the like, and can also be utilized for game consoles, tablet PCs (personal computers), notebook PCs and the like.

REFERENCE SYMBOLS 10a, 10b Image processing device
11a Control means
11b CPU (control unit)
12a Operation means
12b Operation unit (spatial touch panel)
13a Display means
13b Display unit
14b Memory unit
15b Storage unit

The invention claimed is:

1. An image processing device comprising:
a processor; and
memory coupled to the processor storing program instructions that cause the processor to execute a method comprising:
providing a spatial touch panel for receiving an operation from a user, the spatial touch panel to perform spatial recognition;
receiving, from the user, selection of one of a plurality of intensity settings of detection sensitivity or selection of one of a plurality of intensity settings of a stereoscopic protrusion amount of an image, wherein each of the intensity settings of the detection sensitivity indicates a different setting of an intensity of sensitivity of recognizing touch in space by the spatial touch panel;
displaying the intensity settings of the detection sensitivity or the intensity settings of the stereoscopic protrusion amount of the image, wherein the image is displayed stereoscopically;
matching an intensity setting of the stereoscopic protrusion amount of the image to a selected intensity setting of the detection sensitivity when the selection of one of the intensity settings of the detection sensitivity is received; and
matching an intensity setting of the detection sensitivity to a selected intensity setting of the stereoscopic protrusion amount of the image when the selection of one of the intensity settings of the stereoscopic protrusion amount of the image is received;
wherein if the selected intensity setting of the detection sensitivity is set to a first intensity level, the intensity setting of the stereoscopic protrusion amount of the image is automatically changed to a first corresponding intensity level; and
wherein if the selected intensity setting of the stereoscopic protrusion amount of the image is set to a second intensity level, the intensity setting of the detection sensitivity is automatically changed to a second corresponding intensity level.

2. An image processing method for an image processing device comprising a spatial touch panel for receiving an operation from a user, the spatial touch panel configured to perform spatial recognition, the method comprising:
stereoscopically displaying an image;
displaying a plurality of intensity settings of detection sensitivity of the spatial touch panel or a plurality of intensity settings of a stereoscopic protrusion amount of the image, wherein each of the intensity settings of the detection sensitivity indicates a different setting of an intensity of sensitivity of recognizing touch in space by the spatial touch panel;
receiving, from the user, selection of one of the intensity settings of the detection sensitivity of the spatial touch panel or selection of one of the intensity settings of the stereoscopic protrusion amount of an image;
matching an intensity setting of the stereoscopic protrusion amount of the image to a selected intensity setting of the detection sensitivity of the spatial touch panel when the selection of one of the intensity settings of the detection sensitivity of the spatial touch panel is received; and
matching an intensity setting of the detection sensitivity of the spatial touch panel to a selected intensity setting of the stereoscopic protrusion amount of the image when the selection of one of the intensity settings of the stereoscopic protrusion amount of the image is received;
wherein if the selected intensity setting of the detection sensitivity is set to a first intensity level, the intensity setting of the stereoscopic protrusion amount of the image is automatically changed to a first corresponding intensity level; and
wherein if the selected intensity setting of the stereoscopic protrusion amount of the image is set to a second intensity level, the intensity setting of the detection sensitivity is automatically changed to a second corresponding intensity level.

3. A non-transitory computer-readable storage medium storing an image processing program to be executed by a computer comprising a spatial touch panel for receiving an operation from a user, the spatial touch panel configured to perform spatial recognition, the program causing the computer to execute:
stereoscopically displaying an image;
displaying a plurality of intensity settings of detection sensitivity of the spatial touch panel or a plurality of intensity settings of a stereoscopic protrusion amount of the image, wherein each of the intensity settings of the detection sensitivity indicates a different setting of an intensity of sensitivity of recognizing touch in space by the spatial touch panel;
receiving, from the user, selection of one of the intensity settings of the detection sensitivity of the spatial touch panel or selection of one of the intensity settings of the stereoscopic protrusion amount of the image;
matching an intensity setting of the stereoscopic protrusion amount of the image to a selected intensity setting of the detection sensitivity of the spatial touch panel when the selection of one of the intensity settings of the detection sensitivity of the spatial touch panel is received; and
matching an intensity setting of the detection sensitivity of the spatial touch panel to a selected intensity setting of the stereoscopic protrusion amount of the image when the selection of one of the intensity settings of the stereoscopic protrusion amount of the image is received;
wherein if the selected intensity setting of the detection sensitivity is set to a first intensity level, the intensity setting of the stereoscopic protrusion amount of the image is automatically changed to a first corresponding intensity level; and
wherein if the selected intensity setting of the stereoscopic protrusion amount of the image is set to a second intensity level, the intensity setting of the detection sensitivity is automatically changed to a second corresponding intensity level.

* * * * *